(12) United States Patent
Chen et al.

(10) Patent No.: US 11,939,537 B2
(45) Date of Patent: Mar. 26, 2024

(54) REFORMING PROCESS

(71) Applicant: Chevron U.S.A. Inc., San Ramon, CA (US)

(72) Inventors: Cong-Yan Chen, Kensington, CA (US); Emmanuel Behraz, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 47 days.

(21) Appl. No.: 17/605,286

(22) PCT Filed: Apr. 21, 2020

(86) PCT No.: PCT/IB2020/053747
§ 371 (c)(1),
(2) Date: Oct. 21, 2021

(87) PCT Pub. No.: WO2020/217163
PCT Pub. Date: Oct. 29, 2020

(65) Prior Publication Data
US 2022/0243137 A1 Aug. 4, 2022

Related U.S. Application Data

(60) Provisional application No. 62/836,717, filed on Apr. 21, 2019.

(51) Int. Cl.
*C10G 59/06* (2006.01)
*B01D 3/00* (2006.01)
*B01J 29/40* (2006.01)

(52) U.S. Cl.
CPC .............. *C10G 59/06* (2013.01); *B01D 3/00* (2013.01); *B01J 29/40* (2013.01);
(Continued)

(58) Field of Classification Search
CPC ................. C10G 35/095; C10G 59/06; C10G 2300/1044; C10G 2300/308;
(Continued)

(56) References Cited

U.S. PATENT DOCUMENTS 6,051,128 A  4/2000  Nacamuli et al.
7,041,616 B1 * 5/2006 Nenoff .................. B01J 20/324
502/4

(Continued)

OTHER PUBLICATIONS

PCT International Search Report and Written Opinion of PCT/IB2020/053747 dated Jun. 16, 2020.

*Primary Examiner* — Brian A McCaig
(74) *Attorney, Agent, or Firm* — Mark Warzel

(57) ABSTRACT

An improved reforming process for producing aromatic hydrocarbons is disclosed. The process includes two reformers arranged in parallel flow configuration, with the first reformer being a conventional reformer comprising a catalyst selective for reforming $C_{8+}$ hydrocarbons to a reformate and the second reformer comprising a catalyst selective for reforming $C_{7-}$ hydrocarbons to a reformate. In certain embodiments, the first reformer catalyst comprises a conventional alumina catalyst and the second reformer catalyst comprises a ZSM-5 catalyst.

27 Claims, 1 Drawing Sheet

(52) U.S. Cl.
CPC ............... *C10G 2300/1044* (2013.01); *C10G 2300/308* (2013.01); *C10G 2300/4018* (2013.01); *C10G 2400/02* (2013.01)

(58) Field of Classification Search
CPC ........ C10G 2300/4018; C10G 2400/02; B01D 3/00; B01J 29/40
See application file for complete search history.

(56) References Cited

U.S. PATENT DOCUMENTS

| | | |
|---|---|---|
| 8,882,992 B2 | 11/2014 | Chen et al. |
| 2012/0024753 A1* | 2/2012 | Chen .................... C10G 35/085 208/65 |
| 2012/0273392 A1 | 11/2012 | Serban et al. |
| 2014/0066676 A1* | 3/2014 | Cheung .................... B01J 19/24 585/419 |
| 2016/0145507 A1 | 5/2016 | Miller |
| 2018/0272323 A1* | 9/2018 | Mullens ............... B01J 29/7007 |

* cited by examiner

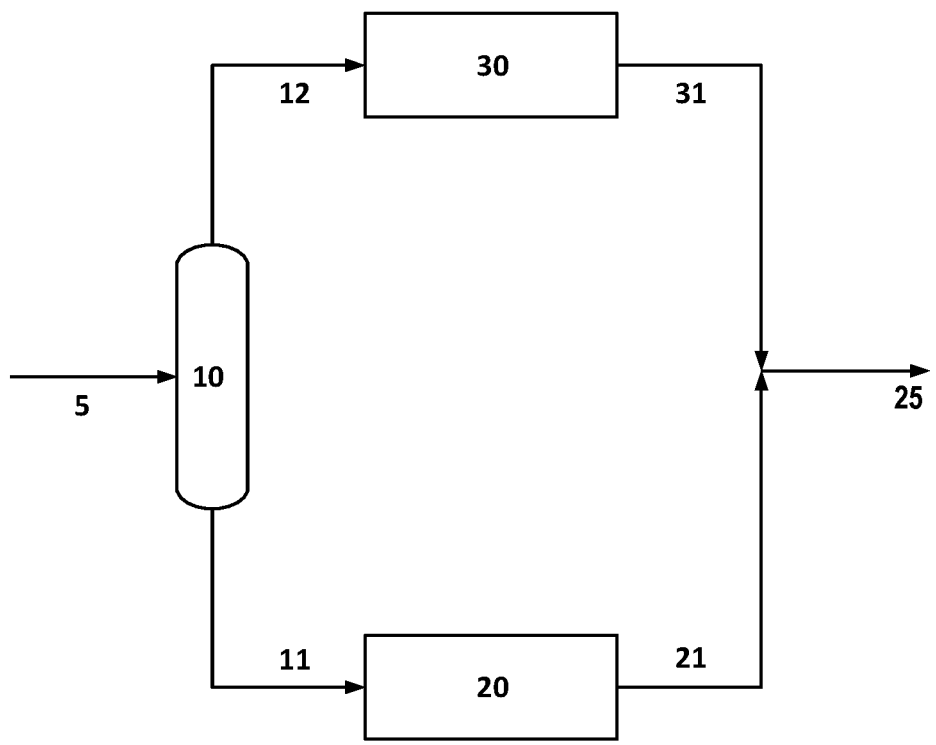

REFORMING PROCESS

CROSS REFERENCE TO RELATED APPLICATIONS

This application claims the benefit of priority to U.S. Provisional Patent Appl. Ser. No. 62/836,717, filed on Apr. 21, 2019, and International Appl. No. PCT/IB2020/053747, filed Apr. 21, 2020, the disclosures of which are herein incorporated in their entirety.

FIELD OF THE INVENTION

The present invention relates to a reforming process for making aromatic hydrocarbons comprising two reformers in parallel flow configuration, each reformer utilizing a catalyst having a specified hydrocarbon selectivity.

BACKGROUND OF THE INVENTION

Catalytic reforming is a basic petroleum refining processes for upgrading light hydrocarbonaceous feedstocks, frequently referred to as naphtha feedstocks. Such feedstocks predominantly comprise $C_6$ to $C_{10}$ hydrocarbons. Products from catalytic reforming can include high octane gasoline useful as automobile fuel, aromatics such as benzene, toluene, xylenes and ethyl benzene, and hydrogen. Reactions typically involved in catalytic reforming include dehydrogenation, dehydrocyclization and isomerization of naphtha range hydrocarbons, with dehydrogenation and dehydrocyclization of linear and slightly branched alkanes and dehydrogenation of cycloparaffins leading to the production of aromatics. Dealkylation and hydrocracking are generally undesirable reactions in reforming processes due to the generally low commercial value of any light hydrocarbons produced and the consumption of hydrogen.

Refiners and aromatics producers are faced with many challenges in the search for improvements in catalytic naphtha reforming, both for higher octane and/or aromatic yield and as a source of hydrogen to meet increasing hydrogen demand. For example, in conventional reforming systems, catalyst life and liquid yield decrease sharply for fixed-bed semi-regen reforming with conventional amorphous alumina catalysts when reformers are operated to provide high-octane, high aromatics production and high-hydrogen make conditions, which generally require catalytic reforming to be conducted at high temperature, low pressure, and/or low $H_2$:hydrocarbon ratio. A short catalyst life and the need for more frequent catalyst regenerations under such conditions significantly reduce operating efficiency and $H_2$ production. As well, the low selectivity of such conventional catalysts to produce aromatics from $C_6$ and $C_7$ paraffins is typically not economical for aromatics producers.

Commercial reforming processes often include a catalyst based on a Group VIIIB metal, such as platinum or palladium, or a Group VIIIB metal plus a second catalytic metal. Suitable metals include rhenium, tin, tungsten, germanium, cobalt, nickel, rhodium, ruthenium, iridium or a combination thereof. The catalytic metal(s) may be dispersed on a support such as alumina, silica, or silica-alumina. Typically, a halogen such as chlorine is also incorporated on the support. In addition to Group VIIIB metals, other reforming catalysts include aluminosilicate zeolite catalysts. Various patents disclose reforming and aromatization of hydrocarbon fractions with a variety of catalysts, including, e.g., U.S. Pat. Nos. 3,761,389; 3,756,942; 3,760,024; 4,927,525; 8,882,992, and 9,115,041. Other reforming catalysts, including borosilicates and silicoaluminophosphates, layered crystalline clay-type phyllosilicates, and amorphous clays, are also described in the literature.

Various processes for reforming a naphtha feedstock in one or more process steps to produce higher value aromatic reformate products are also described in patent and technical publications, including, e.g., U.S. Pat. Nos. 3,415,737; 3,770,614; 3,950,241; 4,181,599; 4,190,519; 8,882,992, and 9,115,041. A number of patents also describe the use of different catalysts in different process steps during the reforming of naphtha feedstocks, including, e.g., U.S. Pat. Nos. 4,627,909; 4,443,326; 4,764,267; 5,073,250; 5,169,813; 5,171,691; 5,182,012; 5,358,631; 5,376,259; 5,407,558; 8,882,992, and 9,115,041.

While advances in naphtha reforming catalysts and processes have benefited commercial reformers, a continuing need exists to develop new and improved reforming processes and methods to provide increased aromatics yield and process throughput, to improve hydrogen production, and to minimize the formation of less valuable low molecule weight ($C_1$-$C_4$) products. The present invention provides a solution to such commercial needs and to the technical limitations of conventional reforming processes.

SUMMARY OF THE INVENTION

The present invention is based on the discovery that improvements in overall aromatics yield and process throughput may be achieved in a reforming process by utilizing more than one reformer arranged in a parallel flow configuration where catalysts of differing selectivities are used in the reformers. By splitting an overall naphtha reforming process feed into a predominantly $C_{7-}$ feedstream and a predominantly $C_{8+}$ feedstream, and passing these intermediate streams to separate parallel reformers containing catalysts having suitable selectivities, the present invention provides advantageous yield and throughput improvements compared with conventional reforming processes.

The inventive reforming process for producing aromatic hydrocarbons separates a hydrocarbonaceous feed predominantly comprising a naphtha fraction into a first feedstream predominantly comprising $C_{8+}$ hydrocarbons and a second feedstream predominantly comprising $C_{7-}$ hydrocarbons. The first feedstream, or a fraction thereof, is subsequently contacted with a first reforming catalyst in a first reformer comprising the first reforming catalyst under first reforming conditions effective to form a first aromatic reformate. The second feedstream, or a fraction thereof, is similarly contacted with a second reforming catalyst in a second parallel reformer comprising a second catalyst under second reforming conditions effective to form a second aromatic reformate. The first catalyst is primarily selective for reforming $C_{8+}$ hydrocarbons to aromatic hydrocarbons, while the second catalyst is primarily selective for reforming $C_{7-}$ hydrocarbons to aromatic hydrocarbons. The first and second reformers are arranged in a parallel flow configuration with each other to separately reform the intermediate feedstreams. First and second aromatic reformates resulting from the parallel reformers, or fractions thereof, may be further combined to form a product and/or an intermediate stream for further treatment.

The invention also relates to a method for modifying an existing or conventional catalytic reforming process by integrating a second reformer with the existing or conventional reformer(s). The method generally includes adding a separation step to split a hydrocarbonaceous feed predominantly comprising a naphtha fraction into first and second intermediate feedstreams comprising, respectively, predominantly $C_{8+}$ and $C_{7-}$ hydrocarbons. A second reformer in parallel flow configuration with the existing or conventional reformer(s) is added to reform the $C_{7-}$ hydrocarbon intermediate feedstream to an aromatic reformate in the second reformer while reforming the $C_{8+}$ hydrocarbon intermediate feedstream to an aromatic reformate in the existing or conventional reformer(s). The modified reformer process resulting from the method comprises providing a hydrocarbonaceous feed predominantly comprising a naphtha fraction; separating the hydrocarbonaceous feed into a first feedstream predominantly comprising $C_{8+}$ hydrocarbons and a second feedstream predominantly comprising $C_{7-}$ hydrocarbons; contacting the first feedstream, or a fraction thereof, with a first reforming catalyst in a first reformer comprising the first reforming catalyst under first reforming conditions effective to form a first aromatic reformate, wherein the first catalyst is primarily selective for reforming $C_{8+}$ hydrocarbons to aromatic hydrocarbons; contacting the second feedstream, or a fraction thereof, in a second reformer comprising the second catalyst under second reforming conditions effective to form a second aromatic reformate, wherein the second catalyst is primarily selective for reforming $C_{7-}$ hydrocarbons to aromatic hydrocarbons; and, optionally, combining the first aromatic reformate, or a fraction thereof, with the second aromatic reformate, or a fraction thereof.

BRIEF DESCRIPTION OF THE DRAWINGS

The FIGURE(s) provide(s) representative views of a reforming process according to an embodiment of the invention. The scope of the invention is not limited by any such representative FIGURE(s) and is to be understood to be defined by the claims of the application.

FIG. 1 shows a simplified schematic view of a reformer process according to an embodiment of the invention.

DETAILED DESCRIPTION

Although illustrative embodiments of one or more aspects are provided herein, the disclosed systems, processes and/or methods may be implemented using any number of techniques. The disclosure is not limited to the illustrative or specific embodiments, drawings, and techniques illustrated herein, including the exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

As disclosed herein, boiling point temperatures are based on ASTM D-2887 standard test method for boiling range distribution of petroleum fractions by gas chromatography, unless otherwise indicated. The mid-boiling point is defined as the 50% by volume boiling temperature, based on an ASTM D-2887 simulated distillation.

As disclosed herein, carbon number values of hydrocarbons (i.e., $C_5$, $C_6$, $C_7$, $C_8$, $C_9$ and the like) may be determined by standard gas chromatography methods.

Unless otherwise specified, as used herein, feed rate to a catalytic reaction zone (e.g., reformer) is reported as the volume of feed per volume of catalyst per hour. The feed rate as disclosed herein is reported in reciprocal hours (i.e., $hr^{-1}$) which is also referred to as liquid hourly space velocity, abbreviated as LHSV.

As used herein, a $C_{4+}$ stream comprises a high proportion of hydrocarbons with 4 or fewer carbon atoms per molecule. Likewise, a $C_{5+}$ stream comprises a high proportion of hydrocarbons with 5 or more carbon atoms per molecule. The same understanding applies for other carbon numbers and ranges, i.e., a $C_{7-}$ stream comprises a high proportion of hydrocarbons with 7 or fewer carbon atoms per molecule, while a $C_{8+}$ stream comprises a high proportion of hydrocarbons with 8 or more carbon atoms per molecule. It will be recognized by those of skill in the art that hydrocarbon streams in refinery processes are generally separated by boiling range using a distillation process. As such, a $C_{7-}$ stream may contain a small quantity of $C_8$ and even $C_9$ molecules. However, a typical distillation would be designed and operated such that at least about 70% by volume of a $C_{7-}$ stream would contain molecules having 7 carbon atoms or fewer per molecule. Thus, at least about 70 vol %, or 80%, or 90% or greater of a $C_{7-}$ stream boils in the $C_{7-}$ boiling range. Similarly, at least about 70 vol %, or 80%, or 90% or greater of a $C_{8+}$ stream boils in the $C_{8+}$ boiling range.

The term "predominantly naphtha fraction" generally refers to a hydrocarbon composition that is predominantly comprised of a $C_6$ to $C_{10}$ fraction, and more particularly, where specified, a predominantly $C_6$ to $C_9$ fraction. The term "predominantly" is used in the normal sense, i.e., that fraction which is the largest (most) in the composition. Naphtha may also comprise lower and higher carbon number molecules, such as $C_5$ and $C_{11}$ to $C_{12}$ hydrocarbons.

The term "silica to alumina ratio" refers to the molar ratio of silicon oxide ($SiO_2$) to aluminum oxide ($Al_2O_3$).

The term "molecular sieve" refers to a crystalline material containing pores, cavities, or interstitial spaces of a uniform size in which molecules small enough to pass through the pores, cavities, or interstitial spaces are adsorbed while larger molecules are not. Examples of molecular sieves include zeolites and non-zeolitic molecular sieves such as zeolite analogs including, but not limited to, SAPOs (silicoaluminophosphates), MeAPOs (metalloaluminophosphates), $AlPO_4$ (aluminophosphates), and ELAPOs (non-metal substituted aluminophosphate families).

When used in this disclosure, unless otherwise specified, the Periodic Table of the Elements referred to is the CAS version published by the Chemical Abstract Service in the Handbook of Chemistry and Physics, $72^{nd}$ edition (1991-1992).

The terms "a," "an," and "the" are intended to include plural alternatives, e.g., at least one. For instance, the disclosure of "a Group VIIIB metal" or "an alkali metal" is meant to encompass one, or mixtures or combinations of more than one, Group VIIIB metal or alkali metal, unless otherwise specified.

In the present process, a hydrocarbonaceous feedstock predominantly comprising a naphtha boiling range fraction is processed in a reforming process wherein two (or more) reformers are operated in parallel flow configuration. The hydrocarbonaceous feed is separated into a first feedstream predominantly comprising $C_{8+}$ hydrocarbons and a second feedstream predominantly comprising $C_{7-}$ hydrocarbons with each feedstream separately passed to each reformer. In a typical configuration, the first feedstream is fed to a first reformer comprising a first reforming catalyst under first reforming conditions effective to form a first aromatic reformate, wherein the first catalyst is primarily selective for reforming $C_{8+}$ hydrocarbons to aromatic hydrocarbons, while the second feedstream is fed to a second parallel reformer comprising a second reforming catalyst under second reforming conditions effective to form a second aromatic reformate, wherein the second catalyst is primarily selective for reforming $C_{7-}$ hydrocarbons to aromatic hydrocarbons.

The invention further relates to a method for modifying an existing reforming process comprising a conventional reforming system that utilizes a catalyst primarily selective for reforming $C_{8+}$ hydrocarbons to aromatic hydrocarbons. The method generally comprises adding a feed separation step and a second parallel reformer to the existing reformer system. More particularly, the separation step comprises separating the hydrocarbonaceous (naphtha) feed to the first (conventional) reformer into a first feedstream predominantly comprising $C_{8+}$ hydrocarbons and a second feedstream predominantly comprising $C_{7-}$ hydrocarbons. The second reformer added to the existing reforming process is added in parallel flow configuration with the first reformer, the second reformer comprising a second reforming catalyst primarily selective for reforming $C_{7-}$ hydrocarbons to aromatic hydrocarbons. The modified catalytic reforming process comprises: providing a hydrocarbonaceous feed predominantly comprising a naphtha fraction; separating the hydrocarbonaceous feed into a first feedstream predominantly comprising $C_{8+}$ hydrocarbons and a second feedstream predominantly comprising $C_{7-}$ hydrocarbons; contacting the first feedstream, or a fraction thereof, with a first reforming catalyst in a first reformer comprising the first reforming catalyst under first reforming conditions effective to form a first aromatic reformate, wherein the first catalyst is primarily selective for reforming $C_{8+}$ hydrocarbons to aromatic hydrocarbons; contacting the second feedstream, or a fraction thereof, in a second reformer comprising the second catalyst under second reforming conditions effective to form a second aromatic reformate, wherein the second catalyst is primarily selective for reforming $C_{7-}$ hydrocarbons to reformate and, optionally, combining the first aromatic reformate, or a fraction thereof, with the second aromatic reformate, or a fraction thereof. Optionally, part of the hydrocarbonaceous (naphtha) feed that is not separated into two feedstreams is combined with the first and second feedstream, respectively, and then reformed in the first and second reformer.

The present invention is based in part on the discovery that selective reforming of $C_{7-}$ hydrocarbons in a parallel reformer provides improved performance of the overall reforming process and is particularly beneficial as a modification of an existing reformer process. Adding a second reformer using a reforming catalyst that is primarily selective for $C_{7-}$ hydrocarbons and separating the overall naphtha feed into $C_{7-}$ and $C_{8+}$ reformer feeds allows each reformer to operate under conditions that are better suited to each feed and to produce a desired aromatic reformate product.

The reforming process is generally operated at conditions and with catalysts selected for dehydrogenation, dehydrocyclization and isomerization reactions to convert low octane paraffins and cycloparaffins into high octane products. A product having an increased yield of aromatics and/or a product containing increased octane is produced. In some embodiments, the reforming process may be operated at conditions and with one or more catalysts for producing an enhanced net positive quantity of hydrogen.

The reforming process of the invention comprises passing a separated feedstream through at least two reformers operated in parallel. In general, each reformer is characterized by one or more reforming reactor vessels, each containing a catalyst and operated at reforming reaction conditions. The aromatic reformate product from each reformer, or a fraction thereof, may be combined to form a final or intermediate product. The temperature of the feed to, or product from, each reformer may be increased or decreased to meet the particular needs of the process. Likewise, the pressure in each reformer may be increased or decreased depending on the catalyst and operational needs. As noted, the two reformers utilize catalysts each with a primary selectivity that is appropriately matched with the feed to each reformer such that the catalysts used are not the same. The second reformer is typically operated at a lower pressure than the first reformer. Operating the second reformer at a lower pressure than the first reformer leads to improvements including: increased aromatics yield, minimized unwanted hydrocracking/dealkylation reactions, increased hydrogen production, and increased overall reforming system throughput. For example, in a scenario according to the invention where the original rate of the naphtha feedstream is 100,000 barrels per day for the existing reformer (which becomes the first reformer in the new parallel configuration). This naphtha feedstream is then separated into $C_{7-}$ and $C_{8+}$ feedstreams at a volume ratio of 3:7, making 30,000 barrels per day $C_{7-}$ feedstream and 70,000 barrels per day $C_{8+}$ feedstream. Since the existing reformer (which is now the first reformer in the new parallel configuration) has a processing capacity of 100,000 barrels feed per day, an additional 30,000 barrels per day $C_{8+}$ feedstream can be added for processing in this reformer. To make this additional 30,000 barrels per day $C_{8+}$ feedstream, 42,857 barrels naphtha feedstream per day is separated into $C_{7-}$ and $C_{8+}$ feedstreams at a volume ratio of 3:7, also creating another 12,857 barrels per day $C_{7-}$ feedstream. In the new parallel configuration, 100,000 barrels per day $C_{8+}$ feedstream is now reformed in the first (and existing) reformer while 42,857 barrels per day $C_{7-}$ feedstream is reformed in the second (and new) reformer. As a result, the total processing capacity is increased from 100,000 to 142,857 barrels per day naphtha feedstream, which is an increase of 42,857 barrels per day, corresponding to greater than 42 volume %.

The process and method of the invention include separation of hydrocarbonaceous (naphtha) feed into $C_{7-}$ and $C_{8+}$ fraction streams, with each stream being indirectly or directly, and/or partly or wholly, fed to the first and second reformers, respectively. While each of the first and second feedstreams are preferably directly fed in whole to the respective first and second reformers, it is contemplated that a portion of each feedstream may be directed to other process operations and that each of these feedstreams may be subjected to intermediate processing before being fed to the reformers. As previously noted, part of the hydrocarbonaceous (naphtha) feed that is not separated into two feedstreams may be combined with the first and second feedstream, respectively, and then reformed in the first and second reformer.

An important aspect of the invention is the recognition of the advantages arising from the use of a catalyst selective for reforming $C_{7-}$ hydrocarbons in a parallel flow configuration with a conventional reforming process. In certain embodiments, such catalysts may comprise a zeolite having a silica to alumina molar ratio of at least 200, or at least 400, or at least 500, or at least 1000, or at least 1500, or at least 2000, a crystallite size of less than 10 microns. Representative catalysts selective for reforming $C_{7-}$ hydrocarbons include ZSM-5, ZSM-11, ZSM-12, ZSM-22, ZSM-23, ZSM-35, ZSM-38, ZSM-48, MCM-22, SSZ-20, SSZ-25, SSZ-26, SSZ-32, SSZ-33, SSZ-35, SSZ-37, SSZ-42, SSZ-43, SSZ-44, SSZ-45, SSZ-47, SSZ-58, SSZ-74, SUZ-4, EU-1, NU-85, NU-87, NU-88, IM-5, TNU-9, ESR-10, TNU-10, or a combination thereof. More particular or preferred representatives of such catalysts include ZSM-5, ZSM-11, ZSM-12, ZSM-22, ZSM-23, ZSM-35, ZSM-38, ZSM-48, or a combination thereof. A particularly useful or preferred catalyst for reforming $C_{7-}$ hydrocarbons comprises ZSM-5, more particularly ZSM-5 having a silica to alumina molar ratio of at least 200, or at least 400, or at least 500, or at least 1000, or at least 1500, or at least 2000.

The catalyst selective for reforming $C_{7-}$ hydrocarbons (second reformer catalyst) typically comprises in the range of between 0.1 wt. % and 5 wt. %, or between 0.1 wt. % and 2 wt. %, or between 0.1 wt. % and 1 wt. %, or between 0.2 wt. % and 0.6 wt. %, of a Group VIIIB metal, or a Group VIIIB metal selected from nickel, ruthenium, rhodium, palladium, iridium, platinum, or a combination thereof, or a Group VIIIB metal selected from iridium, palladium, platinum, or a combination thereof, or a Group VIIIB metal comprising platinum. Typically, the second reformer catalyst comprises platinum and, optionally, another such Group VIIIB metal in the range of between 0.1 wt. % and 5 wt. %, or between 0.1 wt. % and 2 wt. %, or between 0.1 wt. % and 1 wt. %, or between 0.2 wt. % and 0.6 wt. %, of a Group VIIIB metal other than platinum, or a metal selected from rhenium, germanium, tin, lead, gallium, indium, or a combination thereof, or a metal comprising rhenium.

Additional details of catalysts suitable as the catalyst selective for reforming $C_{7-}$ hydrocarbons (second reformer catalyst) are available in, e.g., U.S. Pat. Nos. 8,882,992 and 9,115,041 and other patents and publications.

The catalyst selective for reforming $C_{8+}$ hydrocarbons generally comprises a non-zeolitic naphtha reforming catalyst, or an alumina supported non-zeolitic catalyst comprising a Group VIIIB metal. Such catalysts are typically used as reforming catalysts in commercial processes, e.g., Platformer and Rheniformer catalysts and processes.

Examples of Group VIIIB metals include platinum. The catalyst may further comprise a promoter, such as rhenium, tin, tungsten, germanium, cobalt, nickel, iridium, rhodium, ruthenium, or combinations thereof. In some such embodiments, the promoter metal is rhenium or tin.

When present, sufficient promoter metal is typically included to provide a promoter to platinum ratio between 0.5:1 and 10:1, more preferably between 1:1 and 6:1, most preferably between 2:1 and 5:1. Some examples of conventional catalysts are provided in U.S. Pat. Nos. 3,631,216; 3,415,737; and 4,511,746.

Halogen may be incorporated into the catalyst by combining it with a source of halogen such as alkali or alkaline earth chlorides, fluorides, iodides or bromides. Other halogen sources include compounds such as hydrogen halide, e.g., hydrogen chloride, and ammonium halides, e.g., ammonium chloride. The preferred halogen source is a source of chlorine. The amount of halogen source combined with the catalyst should be such that the catalyst contains from about 0.1 to 3 wt. % halogen, more preferably from about 0.2 to about 1.5 wt. % halogen, and most preferably between 0.5 to 1.5 wt. % halogen.

The above mentioned metals can be disposed on a support such as a refractory inorganic oxide such as alumina, silica, titania, magnesia, zirconia, chromia, thoria, boria or mixtures thereof; a synthetically prepared or naturally occurring clay or silicate, which may be acid-treated; a spinel such as $MgAl_2O_4$, $FeAl_2O_4$, $ZnAl_2O_4$, $CaAl_2O_4$; a silicoaluminophosphate; and combinations of materials from one or more of these groups. The refractory support of the reforming catalyst preferably comprises an inorganic oxide, more preferably alumina.

The reforming catalysts in the first and second reformers may be used in the form of pills, pellets, granules, broken fragments, or various special shapes, disposed as a fixed bed within a reaction zone, and the charging stock may be passed through in the liquid, vapor, or mixed phase, and in either upward, downward or radial flow. Alternatively, the reforming catalysts can be used in moving beds or in fluidized-solid processes, in which the charging stock is passed upward through a turbulent bed of finely divided catalyst. A fixed bed system or a dense-phase moving bed system may benefit from less catalyst attrition and other operational advantages. In a fixed bed system, the feed is preheated (by any suitable heating means) to the desired reaction temperature and then passed into a reaction zone containing a fixed bed of the catalyst. This reaction zone may be one or more separate reactors with suitable means to maintain the desired temperature at the reactor entrance. The temperature must be maintained since reforming processes typically involve endothermic reactions.

The reforming conditions in the first reformer comprising the catalyst primarily selective for reforming $C_{8+}$ hydrocarbons will depend, at least in part, on the feed used, whether highly aromatic, paraffinic or naphthenic and upon the desired aromatic reformate production. The first reformer is generally operated at conditions to minimize the cracking of the stream being upgraded, and to increase the useful lifetime of the reformer catalyst. The naphtha boiling range feedstock to be upgraded in the first reformer contacts the first reformer catalyst at reaction conditions that include a temperature in the range from about 800° F. to about 1100° F., preferably 850° F. to 980° F.; a pressure in the range from about 100 psig to about 500 psig, preferably 150 to 450 psi, more preferably, 200 to 440 psi; a feed rate LHSV in the range of from about 0.1 to about 3.0 $hr^{-1}$, preferably 0.5 to 2.5 $hr^{-1}$, more preferably 1.0 to 2.0 $hr^{-1}$; and a $H_2$:HC hydrogen to hydrocarbon molar ratio in the range of 1:1 to 7:1, preferably 3:1 to 6:1. In some embodiments, the pressure in the first reformer is in the range from about 200 psig to about 400 psig.

The reaction conditions in the second reformer are specified to effectively utilize the performance advantages of the catalyst used in the stage. In general, the second reformer is operated at lower pressure and $H_2$:HC hydrogen to hydrocarbon molar ratio than the first reformer. The reforming conditions in the second reformer comprising the catalyst primarily selective for reforming $C_{7-}$ hydrocarbons will likewise depend, at least in part, on the feed used, whether highly aromatic, paraffinic or naphthenic and upon the desired aromatic reformate production. The second reformer is generally operated at conditions to minimize the cracking of the stream being upgraded, and to increase the useful lifetime of the reformer catalyst. The naphtha boiling range feedstock to be upgraded in the second reformer contacts the second reformer catalyst at reaction conditions that include a temperature in the range from about 800° F. to about 1100° F., preferably 850° F. to 980° F.; a pressure in the range from about 50 psig to about 300 psig, preferably 60 to 200 psi, more preferably 70 to 150 psi; a feed rate LHSV in the range of from about 0.1 to about 3.0 hr$^{-1}$, preferably 0.5 to 2.5 hr$^{-1}$, more preferably 1.0 to 2.0 hr$^{-1}$; and a H$_2$:HC hydrogen to hydrocarbon molar ratio in the range of 1:1 to 6:1, preferably 1.5:1 to 3:1. In some embodiments, the pressure in the second reformer is in the range from about 60 psig to about 100 psig.

FIG. 1 illustrates an embodiment according to the invention. A naphtha boiling range fraction 5 which boils within the range of 50° F. to 550° F. is fed into separator 10 at a feed rate in the range of about 0.5 hr$^{-1}$ to about 6 hr$^{-1}$ LHSV. The effluent 11 from the separator is predominantly a C$_{8+}$ first feedstream that is fed to the first reformer 20. Effluent 12 from the separator is predominantly a C$_{7-}$ second feedstream that is fed to the second reformer 30. First reformer 20 comprises a first catalyst that is primarily selective for reforming C$_{8+}$ hydrocarbons to aromatic hydrocarbons and second reformer 30 comprises a second reforming catalyst primarily selective for reforming C$_{7-}$ hydrocarbons to aromatic hydrocarbons. Reformers 20 and 30 produce reformates 21 and 31, respectively, that may be combined to form a combined product reformate 25.

EXAMPLES

Example 1

A hydrotreated full boiling range naphtha feed had an API of 59.9 and an ASTM D-2887 simulated distillation shown in Table 1. It contained 0.0 wt. % benzene, 5.5 wt. % toluene and 4.2 wt. % C$_8$ aromatics as determined via GC analysis.

Example 2

The hydrotreated full boiling range naphtha feed from Example 1 was distilled into (A) top cut and (B) bottom cut.

(A) The top cut had an API of 67.1 and an ASTM D-2887 simulated distillation shown in Table 1. It contained 0.0 wt. % benzene, 1.7 wt. % toluene and 0.0 wt. % C$_8$ aromatics as determined via GC analysis. The top cut was found to represent 30.7 wt. % of the hydrotreated full boiling range naphtha feed from Example 1.

(B) The bottom cut has an API of 56.9 and an ASTM D-2887 simulated distillation shown in Table 1. It contained 0.0 wt. % benzene, 7.2 wt. % toluene and 7.0 wt. % C$_8$ aromatics as determined via GC analysis. The bottom cut was found to represent 69.3 wt. % of the hydrotreated full boiling range naphtha feed from Example 1.

TABLE 1

| | Example 1 Hydrotreated full boiling range naphtha feed | Example 2A Top cut of Example 1 | Example 2B Bottom cut of Example 1 |
|---|---|---|---|
| API at 60/60 F. | 59.9 | 67.1 | 56.9 |
| REGULAR SIMULATED DISTILLATION | Temperature, ° F. | Temperature, ° F. | Temperature, ° F. |
| (IBP) 0.5 | 132 | 96 | 208 |
| 5 | 166 | 144 | 216 |
| 10 | 191 | 156 | 219 |
| 15 | 197 | 158 | 228 |
| 20 | 209 | 169 | 235 |
| 25 | 211 | 183 | 239 |
| 30 | 217 | 186 | 244 |
| 35 | 218 | 192 | 245 |
| 40 | 229 | 194 | 247 |
| 45 | 235 | 196 | 248 |
| 50 | 244 | 198 | 252 |
| 55 | 245 | 199 | 258 |
| 60 | 247 | 201 | 261 |
| 65 | 252 | 208 | 262 |
| 70 | 260 | 210 | 262 |
| 75 | 261 | 211 | 272 |
| 80 | 265 | 212 | 278 |
| 85 | 275 | 213 | 283 |
| 90 | 284 | 217 | 289 |
| 95 | 292 | 219 | 297 |
| (FBP) 99.5 | 323 | 237 | 327 |

Example 3

Catalyst 1: as described in Example 2 of U.S. Pat. No. 8,882,992. This catalyst was used in Example 5 to reform a hydrotreated full boiling range naphtha feed from Example 1 and in Example 7 to reform the bottom cut feed from Example 2B.

Example 4

Catalyst 2: as described in Example 3 of U.S. Pat. No. 8,882,992. This catalyst was used in Example 6 to reform the top cut feed from Example 2B.

Example 5

The hydrotreated full boiling range naphtha feed from Example 1 was used as feed to catalytic reforming which used the catalyst 1 from Example 3. Reaction conditions included a temperature of 930° F., a pressure of 200 psig, a 5:1 molar ratio of hydrogen to hydrocarbons and a feed rate of 1.5 hr$^{-1}$ LHSV. C5+ yield was 82.6 wt. %. The effluent hydrocarbon stream contained 4.5 wt. %. benzene, 19.6 wt. % toluene and 24.9 wt. % C$_8$ aromatics as determined via GC analysis. The total C$_6$-C$_8$ aromatics yield was 49.0 wt. %.

Example 6

The top cut feed from Example 2A was used as feed to catalytic reforming which used the catalyst 2 from Example 4. Reaction conditions included a temperature of 930° F., a pressure of 80 psig, a 2:1 molar ratio of hydrogen to hydrocarbons and a feed rate of 1.5 hr$^{-1}$ LHSV. C$_{5+}$ yield was 74.6 wt. %. The effluent hydrocarbon stream contained 14.4 wt. %. benzene, 32.5 wt. % toluene and 0.0 wt. % Ca aromatics as determined via GC analysis. The total C$_6$-C$_8$ aromatics yield was 46.9 wt. %.

Example 7

The bottom cut feed from Example 2B was used as feed to catalytic reforming which used the catalyst 1 from Example 3. Reaction conditions included a temperature of 930° F., a pressure of 200 psig, a 5:1 molar ratio of hydrogen to hydrocarbons and a feed rate of 1.5 hr$^{-1}$ LHSV. C$_{5+}$ yield was 82.9 wt. %. The effluent hydrocarbon stream contained 0.8 wt. %. benzene, 16.6 wt. % toluene and 36.6 wt. % C$_8$ aromatics as determined via GC analysis. The total C$_6$-C$_8$ aromatics yield was 54.0 wt. %.

Example 8

According to Example 2, the hydrotreated full boiling range naphtha feed from Example 1 was distilled into (A)

top cut and (B) bottom cut. The top cut was found to represent 30.7 wt. % of the hydrotreated full boiling range naphtha feed from Example 1. The bottom cut was found to represent 69.3 wt. % of the hydrotreated full boiling range naphtha feed from Example 1.

These two cuts were used as feeds, respectively, in Examples 6 and 7 for catalytic reforming. In this example, the products from these two cuts were combined together in a ratio corresponding to a feed mixture consisting of top cut feed in 30.7 wt. % (Example 2A) and bottom cut feed in 69.3 wt. % (Example 2B), the combined product was found to have 5.0 wt. % benzene, 21.5 wt. % toluene and 51.8 wt. % $C_8$ aromatics, which resulted in a total $C_6$-$C_8$ aromatics yield of 51.8 wt. %. These yields were higher than those given in Example 5 which had a total $C_6$-$C_8$ aromatics yield of 49.0 wt. % where the whole hydrotreated full boiling range naphtha feed was reformed without preceding distillation into top and bottom cuts (Examples 2, 6 and 7). It demonstrates the advantage of a combination of Examples 6 and 7 over Example 5 in terms of the aromatics concentration in the total product stream.

Example 9

According to Example 2, the hydrotreated full boiling range naphtha feed from Example 1 was distilled into (A) top cut and (B) bottom cut. The top cut was found to represent 30.7 wt. % of the hydrotreated full boiling range naphtha feed from Example 1. The bottom cut was found to represent 69.3 wt. % of the hydrotreated full boiling range naphtha feed from Example 1.

These two cuts were used as feeds, respectively, in Examples 6 and 7 for catalytic reforming. In this example, the products from these two cuts were combined together in a ratio corresponding to a feed mixture consisting of top cut feed in 30.7 wt. % (Example 2A) and bottom cut feed in 69.3 wt. % (Example 2B), the combined product was found to have 5.0 wt. % benzene, 21.5 wt. % toluene and 51.8 wt. % $C_8$ aromatics, which resulted in a total $C_6$-$C_8$ aromatics yield of 51.8 wt. %. As demonstrated in Example 8, these yields were higher than those given in Example 5 which had a total $C_6$-$C_3$ aromatics yield of 49.0 wt. % where the whole hydrotreated full boiling range naphtha feed was reformed without preceding distillation into top and bottom cuts (Examples 2, 6 and 7).

Furthermore, according to the compositions of the products from Examples 5, 6 and 7, the following estimate was made to further compare the yields (barrels per day) of aromatics from these examples:

(1) Case #1: It is assumed that, in Example 5 above, 100,000 barrels of the hydrotreated full boiling range naphtha feed per day is reformed. Here, an existing reformer with a defined volume of the catalyst from Example 3 is used.

(2) If this hydrotreated full boiling range naphtha feedstream (100,000 barrels per day) is separated into a top cut ($C_{7-}$ feedstream) and a bottom cut ($C_{8+}$ feedstream), as described in Example 2, at an approximate volume ratio of 3:7 (close to the weight ratio of 30.7:69.3 from Example 2), making approximately 30,000 barrels per day $C_{7-}$ feedstream (Example 2A) and 70,000 barrels per day $C_{8+}$ feedstream (Example 2B).

(3) Since the existing reformer with the same amount of the same catalyst (see Case #1 above) has a processing capacity of 100,000 barrels feed per day, an additional 30,000 barrels per day $C_{8+}$ feedstream can be added for processing $C_{8+}$ feedstream in this reformer.

(4) To make this additional 30,000 barrels per day $C_{8+}$ feedstream, 42,857 barrels hydrotreated full boiling range naphtha per day is separated into a $C_{7-}$ and $C_{8+}$ feedstreams at a volume ratio of 3:7, also creating another 12,857 barrels per day $C_{7-}$ feedstream.

(5) Case #2: Now totally 100,000 barrels per day $C_{8+}$ feedstream are reformed in the existing reformer as shown in Example 7 (instead of 70,000 barrels per day $C_{8+}$ feedstream in Case #1 above).

(6) Case #3: Now totally 42,857 barrels per day $C_{7-}$ feedstream are available. Based on the present invention, a new reformer is added to reform this $C_{7-}$ feedstream as shown in Example 6 (instead of 30,000 barrels per day $C_{7-}$ feedstream in Case #1 above).

(7) Case #4: When Case #2 and Case #3 are combined to make Case #4, the total processing capacity is increased from 100,000 (Case #1) to 142,857 (Case #4) barrels per day hydrotreated full boiling range naphtha feedstream, increased by 42,857 barrels per day or by 42.857 volume %. According to the product compositions from Example 5, 6 and 7, the aromatics yields are increased by a factor of ~1.8 when changing from Case #1 to Case #4. This example (Example 9) demonstrates that a combination of Examples 6 and 7 has advantages over Example 5 not only in terms of the aromatics concentration (wt. % or vol. %) in the total product stream (Example 8) but also in terms of the production rates (barrels per day) of aromatics (this example).

The foregoing description of one or more embodiments of the invention is primarily for illustrative purposes, it being recognized that variations are possible that would be within the scope of the invention, as set forth in the following claims.

All patents and publications cited in the foregoing description of the invention are incorporated herein by reference.

What is claimed is:

1. A reforming process for producing aromatic hydrocarbons comprising providing a hydrocarbonaceous feed predominantly comprising a naphtha fraction; separating the hydrocarbonaceous feed into a first feedstream predominantly comprising $C_{8+}$ hydrocarbons and a second feedstream predominantly comprising $C_{7-}$ hydrocarbons;

contacting the first feedstream, or a fraction thereof, with a first reforming catalyst in a first reformer comprising the first reforming catalyst under first reforming conditions effective to form a first reformate, wherein the first catalyst is primarily selective for reforming $C_{8+}$ hydrocarbons to aromatic hydrocarbons;

contacting the second feedstream, or a fraction thereof, with a second reforming catalyst in a second reformer comprising a second catalyst under second reforming conditions effective to form a second reformate, wherein the second catalyst is primarily selective for reforming $C_{7-}$ hydrocarbons to aromatic hydrocarbons, and wherein the catalyst selective for reforming $C_{7-}$ hydrocarbons is selected from ZSM-5, ZSM-11, ZSM-12, ZSM-22, ZSM-23, ZSM-35, ZSM-38, ZSM-48, MCM-22, SSZ-20, SSZ-25, SSZ-26, SSZ-32, SSZ-33, SSZ-35, SSZ-37, SSZ-42, SSZ-43, SSZ-44, SSZ-45, SSZ-47, SSZ-58, SSZ-74, SUZ-4, EU-1, NU-85, NU-87, NU-88, IM-5, TNU-9, ESR-10, TNU-10, or a combination thereof, and the second reformer is in parallel flow configuration with the first reformer; and optionally, combining the first reformate, or a fraction thereof, with the second reformate, or a fraction thereof.

2. The process of claim 1, wherein the first and second catalysts are not the same.

3. The process of claim 1, wherein the $C_{7-}$ hydrocarbon fraction is directly fed to the catalyst selective for reforming $C_{7-}$ hydrocarbons to aromatic hydrocarbons.

4. The process of claim 1, wherein the $C_{8+}$ hydrocarbon fraction is directly fed to the catalyst selective for reforming $C_{8+}$ hydrocarbons to aromatic hydrocarbons.

5. The process of claim 1, wherein the catalyst selective for reforming $C_{7-}$ hydrocarbons comprises a zeolite having a silica to alumina molar ratio of at least 200.

6. The process of claim 1, wherein the catalyst selective for reforming $C_{7-}$ hydrocarbons is selected from ZSM-5, ZSM-11, ZSM-12, ZSM-22, ZSM-23, ZSM-35, ZSM-38, ZSM-48, or a combination thereof.

7. The process of claim 1, wherein the catalyst selective for reforming $C_{7-}$ hydrocarbons comprises ZSM-5.

8. The process of claim 7, wherein the ZSM-5 has a silica to alumina molar ratio of at least 200.

9. The process of claim 1, wherein the catalyst selective for reforming $C_{7-}$ hydrocarbons comprises in the range of between 0.1 wt. % and 5 wt. % of a Group VIIIB metal, optionally, wherein the Group VIIIB metal is selected from nickel, ruthenium, rhodium, palladium, iridium, platinum, or a combination thereof.

10. The process of claim 1, wherein the catalyst selective for reforming $C_{7-}$ hydrocarbons comprises in the range of between 0.1 wt. % and 5 wt. % of a Group VIIIB metal other than platinum.

11. The process of claim 1, wherein the catalyst selective for reforming $C_{8+}$ hydrocarbons comprises a non-zeolitic naphtha reforming catalyst, or an alumina supported non-zeolitic catalyst comprising a Group VIIIB metal.

12. The process of claim 1, wherein the reforming of the $C_{7-}$ hydrocarbons to aromatic hydrocarbons includes conditions of: a pressure in the range of 50 to 300 psi; a temperature in the range of 800° F. to 1100° F.; an LHSV of 0.1 to 3.0 hr$^{-1}$; and a $H_2$:HC hydrogen to hydrocarbon molar ratio in the range of 1:1 to 6:1.

13. The process of claim 1, wherein the reforming of the $C_{8+}$ hydrocarbons to aromatic hydrocarbons includes conditions of: a pressure in the range of 100 to 500 psi; a temperature in the range of 800° F. to 1100° F.; an LHSV of 0.1 to 3.0 hr-$^1$; and a $H_2$:HC hydrogen to hydrocarbon molar ratio in the range of 1:1 to 7:1.

14. A method for modifying a catalytic reforming process, wherein, the catalytic reforming process comprises a first reformer comprising a first reforming catalyst primarily selective for reforming $C_{8+}$ hydrocarbons to aromatic hydrocarbons;

the method comprising,
separating a hydrocarbonaceous feed to the first reformer predominantly comprising a naphtha fraction into a first feedstream predominantly comprising $C_{8+}$ hydrocarbons and a second feedstream predominantly comprising $C_{7-}$ hydrocarbons;
adding a second reformer to the catalytic reforming process, in parallel flow configuration with the first reformer, the second reformer comprising a second reforming catalyst primarily selective for reforming $C_{7-}$ hydrocarbons to aromatic hydrocarbons;
wherein the modified catalytic reforming process comprises:
providing a hydrocarbonaceous feed predominantly comprising a naphtha fraction;
separating the hydrocarbonaceous feed into a first feedstream predominantly comprising $C_{8+}$ hydrocarbons and a second feedstream predominantly comprising $C_{7-}$ hydrocarbons;
contacting the first feedstream, or a fraction thereof, with a first reforming catalyst in a first reformer comprising the first reforming catalyst under first reforming conditions effective to form a first reformate, wherein the first catalyst is primarily selective for reforming $C_{8+}$ hydrocarbons to aromatic hydrocarbons;
contacting the second feedstream, or a fraction thereof, in a second reformer comprising the second catalyst under second reforming conditions effective to form a second reformate, wherein the second catalyst is primarily selective for reforming $C_{7-}$ hydrocarbons to aromatic hydrocarbons; and
optionally, combining the first reformate, or a fraction thereof, with the second reformate, or a fraction thereof.

15. The method of claim 14, wherein the first and second catalysts are not the same.

16. The method of claim 14, wherein the $C_{7-}$ hydrocarbon fraction is directly fed to the catalyst selective for reforming $C_{7-}$ hydrocarbons to aromatic hydrocarbons.

17. The method of claim 14, wherein the $C_{8+}$ hydrocarbon fraction is directly fed to the catalyst selective for reforming $C_{8+}$ hydrocarbons to aromatic hydrocarbons.

18. The method of claim 14, wherein the catalyst selective for reforming $C_{7-}$ hydrocarbons comprises a zeolite having a silica to alumina molar ratio of at least 200.

19. The method of claim 14, wherein the catalyst selective for reforming $C_{7-}$ hydrocarbons is selected from ZSM-5, ZSM-11, ZSM-12, ZSM-22, ZSM-23, ZSM-35, ZSM-38, ZSM-48, MCM-22, SSZ-20, SSZ-25, SSZ-26, SSZ-32, SSZ-33, SSZ-35, SSZ-37, SSZ-42, SSZ-43, SSZ-44, SSZ-45, SSZ-47, SSZ-58, SSZ-74, SUZ-4, EU-1, NU-85, NU-87, NU-88, IM-5, TNU-9, ESR-10, TNU-10, or a combination thereof.

20. The method of claim 14, wherein the catalyst selective for reforming $C_{7-}$ hydrocarbons is selected from ZSM-5, ZSM-11, ZSM-12, ZSM-22, ZSM-23, ZSM-35, ZSM-38, ZSM-48, or a combination thereof.

21. The method of claim 14, wherein the catalyst selective for reforming $C_{7-}$ hydrocarbons comprises ZSM-5.

22. The method of claim 21, wherein the ZSM-5 has a silica to alumina molar ratio of at least 200, or at least 400, or at least 500, or at least 1000, or at least 1500, or at least 2000.

23. The method of claim 14, wherein the catalyst selective for reforming $C_{7-}$ hydrocarbons comprises in the range of between 0.1 wt. % and 5 wt. %, or between 0.1 wt. % and 2 wt. %, or between 0.1 wt. % and 1 wt. %, or between 0.2 wt. % and 0.6 wt. %, of a Group VIIIB metal, or a Group VIIIB metal selected from nickel, ruthenium, rhodium, palladium, iridium, platinum, or a combination thereof, or a Group VIIIB metal selected from iridium, palladium, platinum, or a combination thereof, or a Group VIIIB metal comprising platinum.

24. The method of claim 14, wherein the catalyst selective for reforming $C_{7-}$ hydrocarbons comprises in the range of between 0.1 wt. % and 5 wt. %, or between 0.1 wt. % and 2 wt. %, or between 0.1 wt. % and 1 wt. %, or between 0.2 wt. % and 0.6 wt. %, of a Group VIIIB metal other than platinum, or a metal selected from rhenium, germanium, tin, lead, gallium, indium, or a combination thereof, or a metal comprising rhenium.

25. The method of claim 14, wherein the catalyst selective for reforming $C_{8+}$ hydrocarbons comprises a non-zeolitic naphtha reforming catalyst, or an alumina supported non-zeolitic catalyst comprising a Group VIIIB metal.

26. The method of claim 14, wherein the reforming of the $C_{7-}$ hydrocarbons to aromatic hydrocarbons includes conditions of: a pressure in the range of 50 to 300 psi; a temperature in the range of 800° F. to 1100° F.; an LHSV of 0.1 to 3.0 hr$^{-1}$; and a $H_2$:HC hydrogen to hydrocarbon molar ratio in the range of 1:1 to 6:1.

27. The method of claim 14, wherein the reforming of the $C_{8+}$ hydrocarbons to aromatic hydrocarbons includes conditions of: a pressure in the range of 100 to 500 psi; a temperature in the range of 800° F. to 1100° F.; an LHSV of 0.1 to 3.0 hr$^{-1}$; and a $H_2$:HC hydrogen to hydrocarbon molar ratio in the range of 1:1 to 7:1.

* * * * *